Dec. 26, 1922.
E. ABORN.
FILTER COFFEEPOT.
FILED JUNE 16, 1919.
1,440,047.
4 SHEETS—SHEET 1.
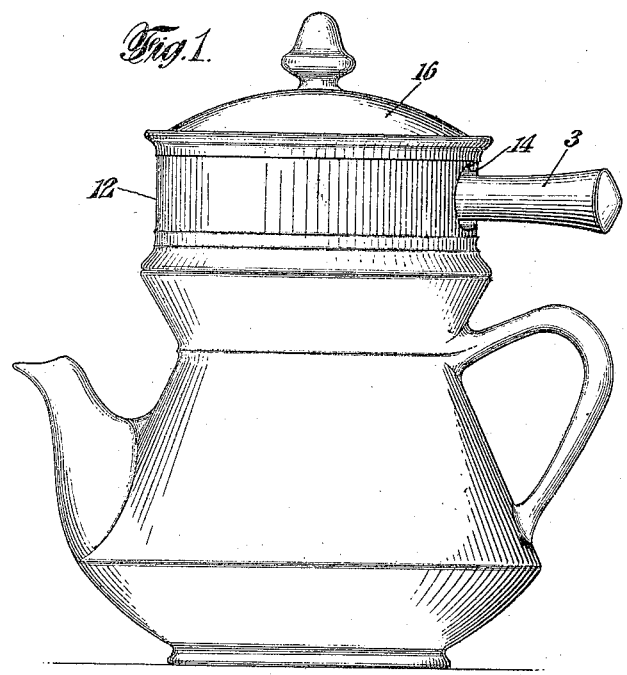
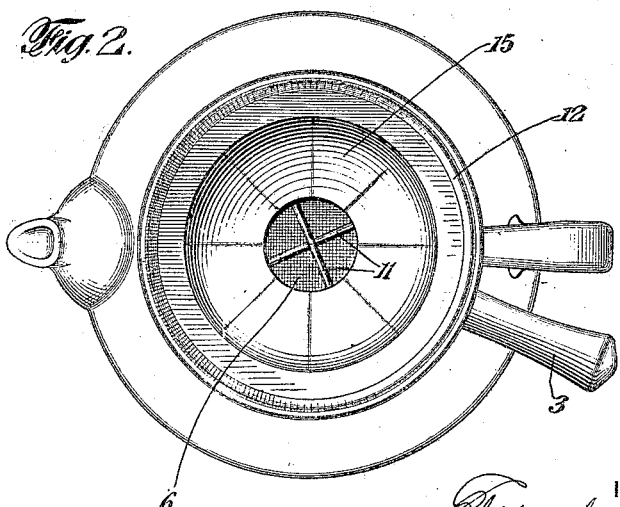
INVENTOR
Edward Aborn,
BY
Pringle, Wright & Snell
ATTORNEYS Dec. 26, 1922.
E. ABORN.
FILTER COFFEEPOT.
FILED JUNE 16, 1919.
1,440,047.
4 SHEETS—SHEET 2.
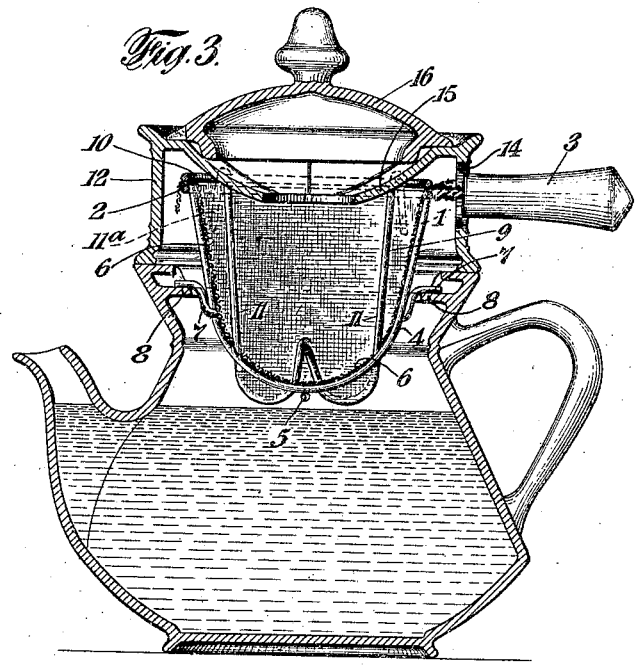
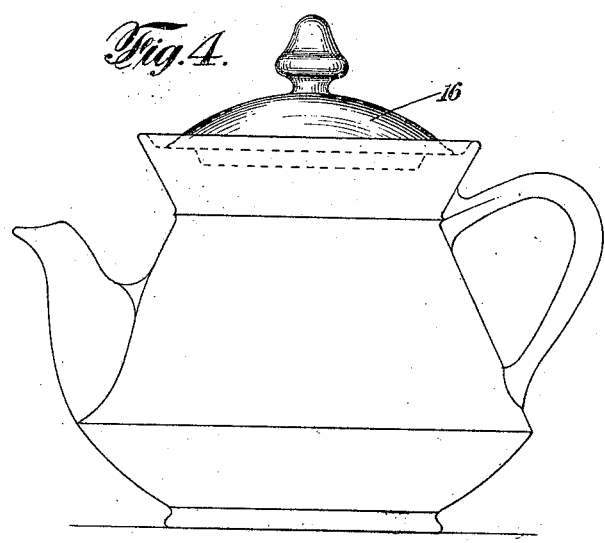
INVENTOR
Edward Aborn,
BY
Pringle, Wright & Small
ATTORNEYS

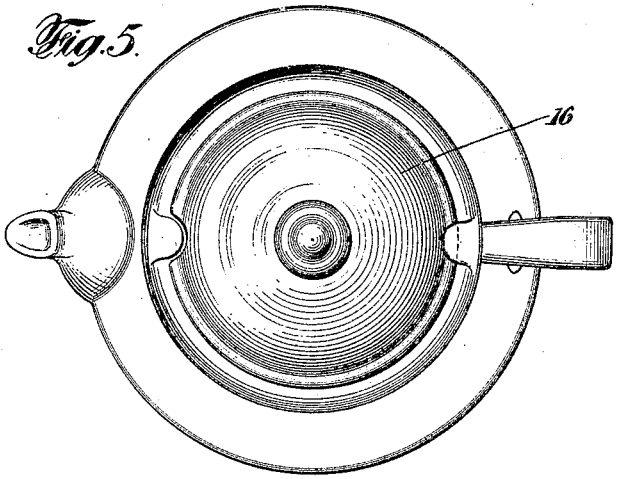
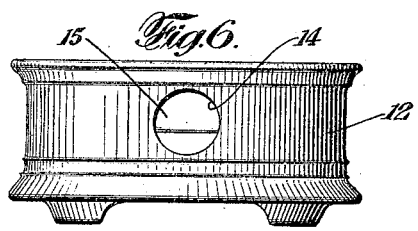
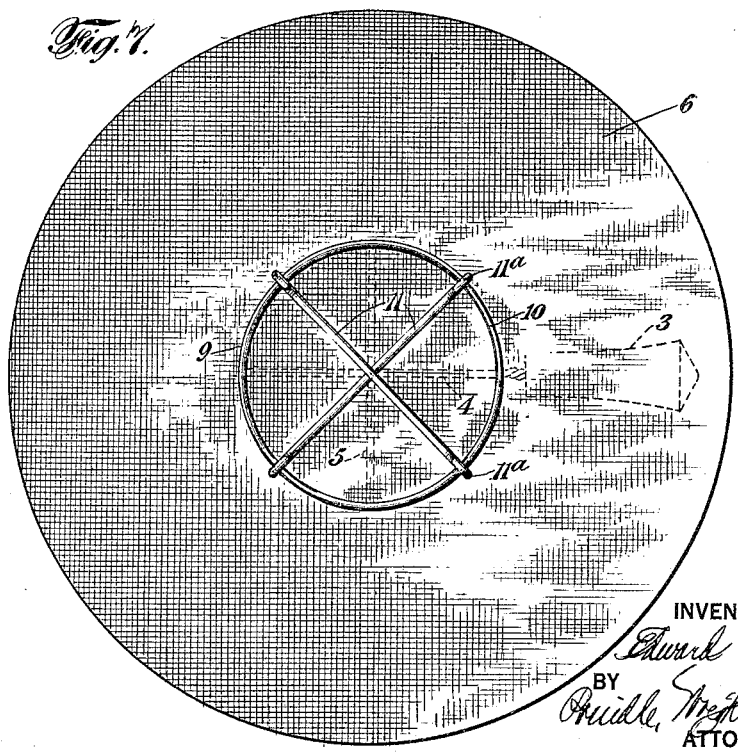

Dec. 26, 1922.
E. ABORN.
FILTER COFFEEPOT.
FILED JUNE 16, 1919.
1,440,047.
4 SHEETS—SHEET 4.
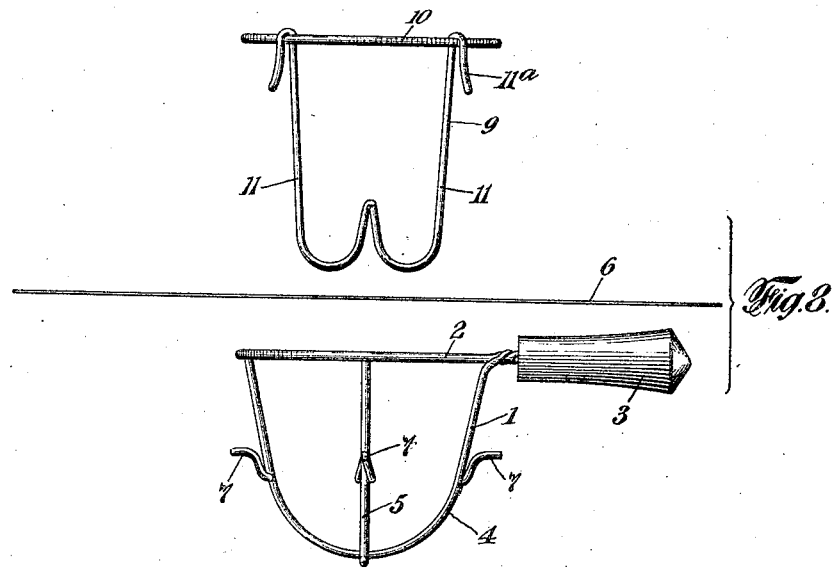
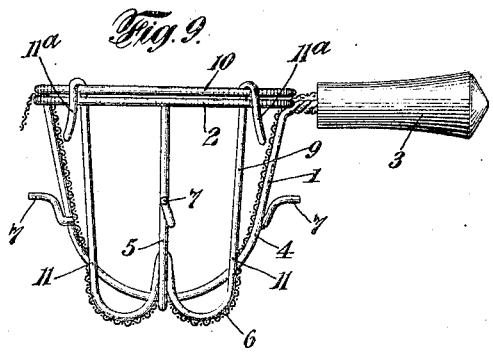

Patented Dec. 26, 1922.

1,440,047

UNITED STATES PATENT OFFICE.

EDWARD ABORN, OF EAST ORANGE, NEW JERSEY.

FILTER COFFEEPOT.

Application filed June 16, 1919. Serial No. 304,430.

*To all whom it may concern:*

Be it known that I, EDWARD ABORN, a citizen of the United States, residing at East Orange, in the county of Essex and State of New Jersey, have invented a certain new and useful Filter Coffeepot, of which the following is a specification.

The object of my invention has been to provide a filter coffee pot which shall have large capacity for holding made coffee, which shall enable coffee to be made speedily and efficiently and with but slight contact with metal, which comprises a coffee pot which is capable of being made of attractive appearance notwithstanding that it encloses and conceals the percolator proper and which is convenient to operate, and to such ends my invention consists in the filter coffee pot hereinafter specified.

In the accompanying drawings, Fig. 1 is a side elevation of a coffee percolator embodying my invention. Fig. 2 is a plan view of Fig. 1, with the cover removed. Fig. 3 is a central vertical section of Fig. 1. Fig. 4 is a side view of the pot with the percolator removed. Fig. 5 is a plan view of the pot with the percolator removed. Fig. 6 is a rear view of the cover for the percolator proper. Fig. 7 is a plan view of the filter cloth and means for holding it. Fig. 8 is a side view of the parts shown in Fig. 7. Fig. 9 is a side view of the parts shown in Fig. 8 assembled, the cloth being shown in sections.

My invention is capable of embodiment in many different forms, and while I shall illustrate it by an embodiment which may be considered an improvement upon the coffee percolator shown in my Patent #1,005,096, dated October 3, 1911, my invention is not to be confined to the illustrated form.

The illustrated form of my invention consists primarily of a percolator proper and a pot which is adapted to contain and conceal the percolator. The percolator comprises an outer frame 1 consisting of a ring 2 having a handle 3, the latter being preferably formed of china to conform with the pot to be later described. Loops 4 and 5 depend from the ring and form in effect a basket to hold a filter cloth 6, which may be a plain piece of cloth and does not require any cutting or sewing into bag form. Fingers 7 are formed on or attached to one or more vertical portions of the said loops, which fingers rest upon and are supported by a ledge 8 that is formed on the body of the pot. The fingers not only support the coffee percolator proper but they space the percolator away from the side of the pot. This avoids contact of the filter cloth with the sides of the pot and consequently of leakage or dripping of the water at points where it is not desired. The filter cloth is held in bag form within the outer frame 1 by an inner frame 9 consisting of a ring 10 having wires 11 depending therefrom and preferably secured together at the center. The wires 11 rise upwardly as they approach the center and are so proportioned to the loops of the outer frame that the lower-most portions of the bends of the wires 11 are at a low enough level to press the portion of the filter cloth which touches those bends below the level of the portion of the filter cloth which rests upon the crossed loops of the outer frame. Thus, a plurality of separate depressions is made in the bottom of the filter bag, and the water passing through the ground coffee will drip from the points thus formed and will be effectively distributed throughout the mass of coffee, so that the danger is lessened that any of the coffee will not be properly percolated. This arrangement also accomplishes the percolation more speedily than would be the case if the bag had only one point from which the water dripped and thus the time of contact of the water with the ground coffee is shortened. This enables the percolation to be accomplished with less danger of leaching out the deleterious substances in the coffee bean and insures that the coffee will only contain the desired elements of the coffee which are those that will most quickly dissolve in water. This increased speed of percolation also reduces the time of contact of the coffee with the metal of the wires, which is a desirable thing to accomplish, as a harmful chemical action tends to set up between the coffee and the metal.

My form of percolator enables a relatively large amount of coffee grounds to be contained in a comparatively small pot without causing the coffee grounds to be percolated less quickly or with less thoroughness and uniformity. The wires 11 are preferably bent over the ring of the inner frame and the free ends are bent toward the main portions of the wires 11, so that such ends form spring hooks 11ª that extend over and grip the ring of the outer frame and thus fasten the two frames together with the filter cloth between them.

The parts are preferably so proportioned that the bottom of the filter cloth cannot become submerged in the water in the body of the pot; that is, the exit of the spout is at a level below the bottom of the filter cloth. Thus, the coffee grounds in the filter cloth cannot steep in the made coffee standing in the bottom of the pot.

I desire to so construct the pot that the coffee percolator proper, as before stated, will be concealed and yet to make the parts of china so as to avoid as much as possible the harmful effect from the coffee coming in contact with metal. It is desirable for this reason to make the body of the pot of china. It is also desirable for the sake of appearances to make the parts enclosing the percolator proper of china. I have therefore provided a percolator enclosure in the form of a ring 12 having an opening through which the handle 3 may extend, such opening being preferably in the form of a hole 14, as the hole does not weaken the ring to any great extent. This construction makes it safe to form the casing of pottery, as would not be so desirable to do if only a notch were provided for the handle. At the upper edge of the ring 12 just above the level of the frames holding the filter cloth, a funnel 15 is formed which is preferably integral with the ring. The lower edge of the funnel preferably comes just below the level of the rings at the top of the frames of the percolator proper and thus serves as a gauge to indicate the level above which the water should not be permitted to rise, to prevent its overflowing the said frames and passing down into the body of the pot without going through the coffee and also to prevent the overflowing water from carrying coffee grounds down into the body of the pot. The casing and percolator proper can both be raised from the pot by simply taking hold of the handle 3, and thus the contents of the pot can very easily be inspected at any time to determine just how much coffee the pot encloses. The casing not only encloses and conceals the cloth and its unavoidable discoloration but at the same time tends to hold in the heat during and after the percolation. The casing, to a large extent, conceals the cloth even when the casing and percolator proper are lifted off to inspect the interior of the pot. The one handle thus serves both for the coffee percolator proper and the casing. The casing in passing down outside the percolator proper carries the edges of the filter cloth downward out of the way of the water and out of sight.

By changing the form or size of the inner frame of the percolator proper, consisting of the ring 10 and the wires attached thereto, the capacity may be varied to suit the requirements as to the amount of coffee to be made.

I also preferably provide a lid 16 and form depressions both in the top of the coffee pot and in the top of the cover to receive the lid, so that the latter can be used either on the cover or when the latter and the percolator proper are removed, so that the lid can be used on the body of the coffee pot.

My percolator not only possesses the advantages heretofore mentioned but it may be said in general that it enables coffee to be made which is of great purity, and to be made quickly and easily and with an economical use of coffee grounds. While it also enables a filter cloth to be used which is merely a disc of cloth without any making and which can be removed and renewed with great facility, the cloth is entirely concealed in a shapely pot. While my pot enables coffee to be made by percolation, the vertical dimension of the casing, in which the percolating parts are contained, is comparatively short, producing a more attractive appearance than a pot in which the said part is taller. The casing which encloses the percolator proper serves to hold the percolator above the level of the coffee solution in the pot, which is a very desirable object, as the immersing of the coffee grounds by the rising of the coffee solution, would result in leaching out from the grounds the oils and other principles which are deleterious and which I have taken so much pains to avoid. Moreover, when the coffee solution has been formed, the casing 12, and with it the percolator, can be removed from the pot, and the lid 16 placed upon the top of the pot proper, thus both making the coffee pot (as shown in Fig. 4) lighter and easier to handle and keeping the coffee solution hot.

I claim:

1. In a coffee percolator, a filter adapted to support the ground coffee, said filter having a plurality of depressions in its bottom so as to cause the liquid which has passed through the ground coffee to drip from each of said depressions, and means for supporting said filter above the body of liquid in the bottom of the percolator.

2. In a coffee percolator, a cloth filter adapted to support the ground coffee and having a plurality of depressions so as to cause the liquid which has passed through the ground coffee to drip from each of said depressions, and means for supporting said filter above the level of the body of liquid in the bottom of the pot.

3. In a coffee percolator, the combination of a plain filter cloth and means for holding such cloth so as to form a plurality of depressions from each of which water will drop.

4. In a coffee percolator, the combination of an outer frame and an inner frame and a piece of fabric, said frames being adapted to engage the fabric between them and hold it in the form of a bag having a plurality of depressions in its bottom.

5. In a coffee percolator, the combination of an inner frame and an outer frame each having depending loops, and a filter cloth, said loops being so arranged as to form a plurality of depressions in the filter cloth.

6. In a coffee percolator, the combination of a pot having a ledge, a frame having a ring, loops depending from said ring and means on said loops for supporting said frame from said ledge.

7. In a coffee percolator, the combination of a pot having a ledge, a frame having a ring, loops depending from said ring, and means on said loops for supporting said frame from said loops, said means comprising fingers.

8. In a coffee percolator, the combination of a pot having a ledge, a frame having a ring, loops depending from said ring, and means on said loops for supporting said frame from said ledge, said means comprising fingers, said fingers being adapted not only to support the frame but to space it away from said ledge.

9. In a coffee percolator, the combination of an inner frame and an outer frame, each of which has a ring and depending means for supporting a filter cloth between said frame, said inner frame having springs adapted to pass over and engage the ring of said outer frame.

10. In a coffee percolator, the combination of a pot, a percolator proper adapted to be supported directly upon said pot and to extend above the top of said casing, a casing adapted to enclose said percolator and to be supported directly upon said pot, and a lid for said casing.

11. In a coffee percolator, the combination of a pot, a percolator proper, said percolator proper extending above the top of the pot adapted to be supported by said pot, and a casing for said percolator, said percolator proper having a handle and said casing having an opening through which said handle may project laterally outside of the casing.

12. In a coffee percolator, the combination of a pot, a percolator proper, adapted to be supported by said pot, said percolator proper comprising a frame and means for supporting a plain filter cloth on said frame in the form of a bag, said percolator proper extending above the top of the casing, and a casing adapted to enclose and conceal said percolator proper.

13. In a coffee percolator, the combination of a pot, a percolator proper, adapted to be supported by said pot, said percolator proper extending above the top of the pot said percolator proper comprising a frame and means for supporting a plain filter cloth on said frame in the form of a bag, and a casing adapted to enclose and conceal said percolator proper, said percolator proper having a handle and said casing having an opening through which said handle may project laterally beyond the casing.

14. In a coffee percolator, the combination of a pot, a percolator proper comprising a frame adapted to rest on said pot and having a filter cloth in the form of a bag, a percolator proper extending above the top of the pot, and a casing adapted to enclose said percolator proper, said casing having a funnel shaped portion over the mouth of said bag.

15. In a coffee percolator, the combination of a pot, a percolator proper comprising a frame adapted to rest on said pot and having means for maintaining a plain filter cloth in the form of a bag, a percolator proper extending above the top of the pot and a casing adapted to enclose said percolator proper, said casing having a funnel shaped portion over the mouth of said bag.

16. In a coffee percolator, the combination of a pot, a percolator proper comprising a frame adapted to rest on said pot and having a filter cloth in the form of a bag a percolator proper extending above the top of the pot, and a cover adapted to enclose said percolator proper, said casing having a funnel-shaped portion over the mouth of said bag, said funnel-shaped portion extending below the level of the mouth of said bag.

17. In a coffee percolator, the combination of a pot, a percolator proper comprising a frame adapted to rest on said pot and having means for maintaining a plain filter cloth in the form of a bag a percolator proper extending above the top of the pot and a casing adapted to enclose said percolator proper, said casing having a funnel-shaped portion over the mouth of said bag, said funnel-shaped portion extending below the level of the mouth of said bag.

18. In a coffee percolator, the combination of a pot, a percolator proper comprising a frame adapted to rest on said pot and having a filter cloth in the form of a bag, a percolator proper extending above the top of the pot, a casing adapted to enclose said percolator proper, said casing having a funnel-shaped portion over the mouth of said bag, and a lid adapted to close said funnel.

19. In a coffee percolator, the combination of a pot, a percolator proper comprising a frame adapted to rest on said pot and having means for maintaining a plain filter cloth in the form of a bag, a percolator proper extending above the top of the pot, a casing adapted to enclose said percolator proper, said casing having a funnel-shaped portion over the mouth of said bag and a lid adapted to close said funnel.

20. In a coffee percolator, the combination of a pot, a percolator proper, adapted to be supported by said pot, said percolator proper consisting of a frame, and means for supporting a plain filter cloth on said frame in the form of a bag, said percolator proper extending above the top of the pot and a casing comprising a funnel portion supported by an annular wall, said casing being open below so that it may be placed over said frame by a downward movement and turn the free edge of said filter cloth outward and downward.

In testimony that I claim the foregoing, I have hereunto set my hand this 10th day of June, 1919.

EDWARD ABORN.